Figure 1:
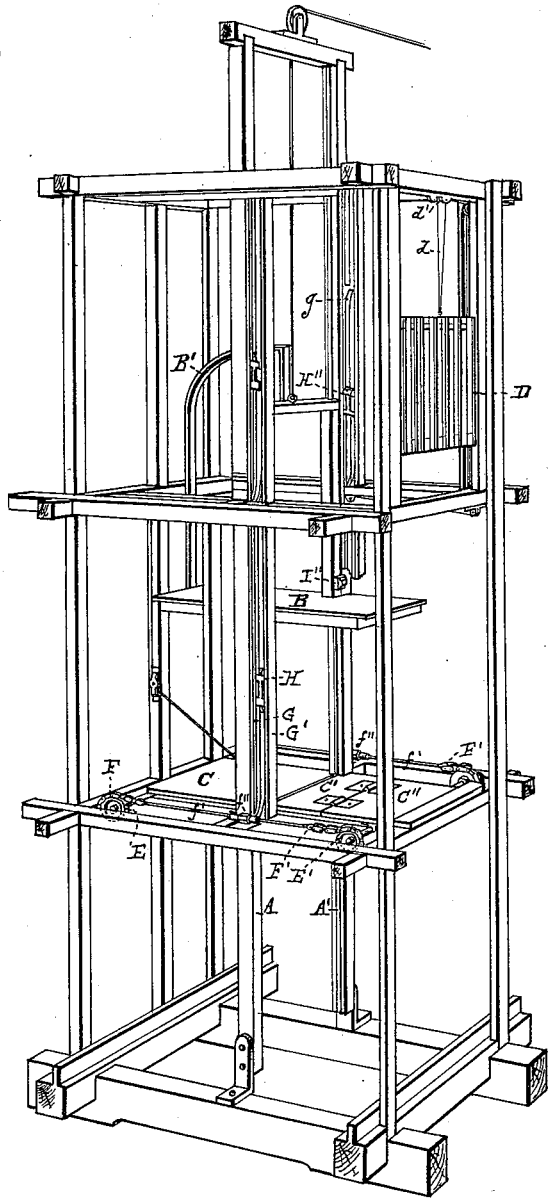

No. 613,468. Patented Nov. 1, 1898.
J. PAPINEAU & F. HYSERT.
MECHANISM FOR ACTUATING DOORS OR GATES OF ELEVATORS.
(Application filed July 6, 1897.)
(No Model.) 5 Sheets—Sheet 1.

Witnesses: Inventors:
Jos. Papineau,
Frank Hysert
by Michael Stark — Sons
Attorneys.

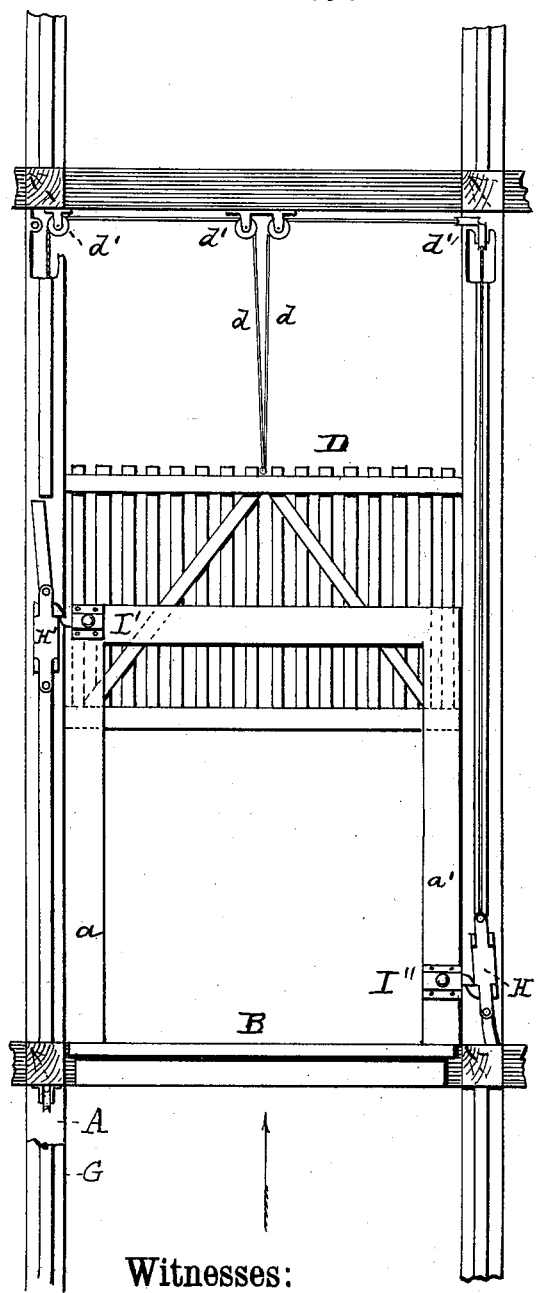
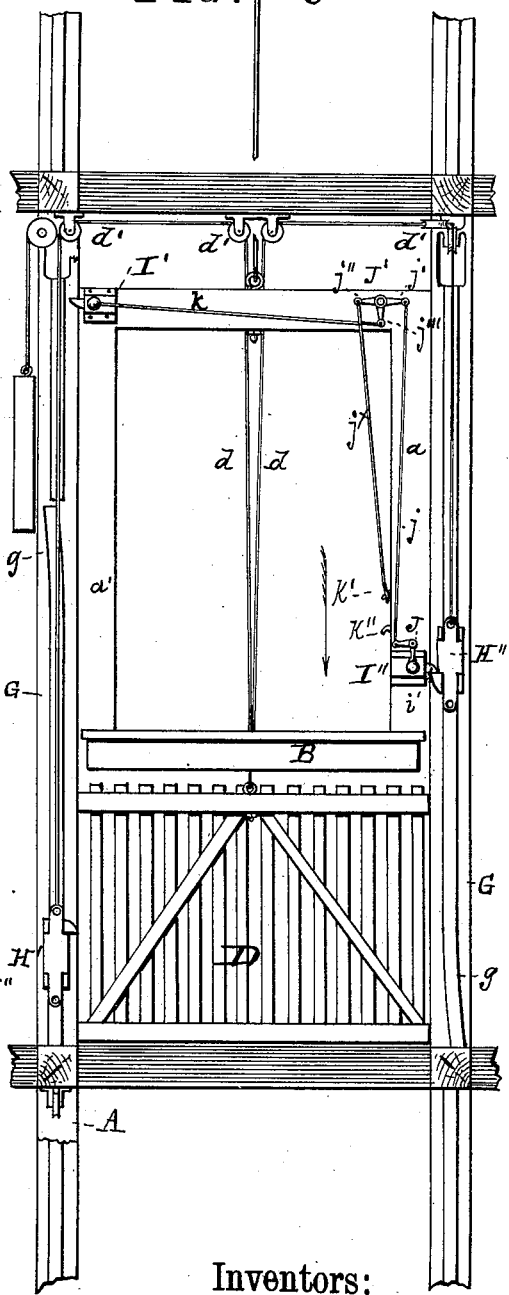

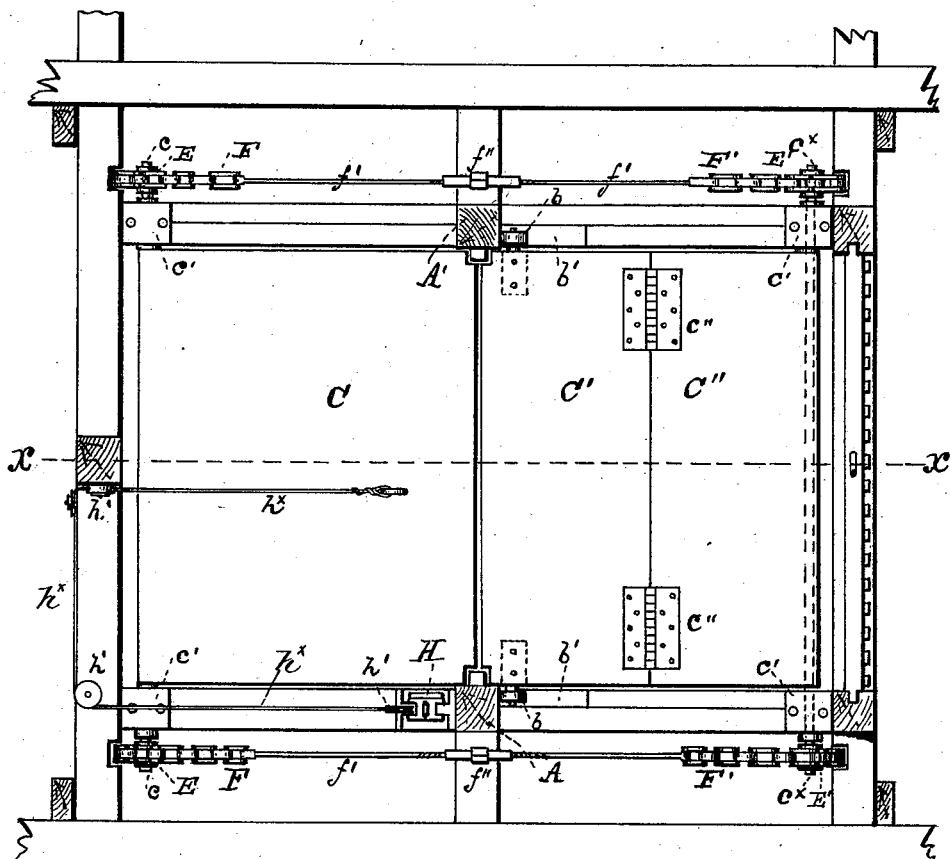

No. 613,468. Patented Nov. 1, 1898.
J. PAPINEAU & F. HYSERT.
MECHANISM FOR ACTUATING DOORS OR GATES OF ELEVATORS.
(Application filed July 6, 1897.)
(No Model.) 5 Sheets—Sheet 4.
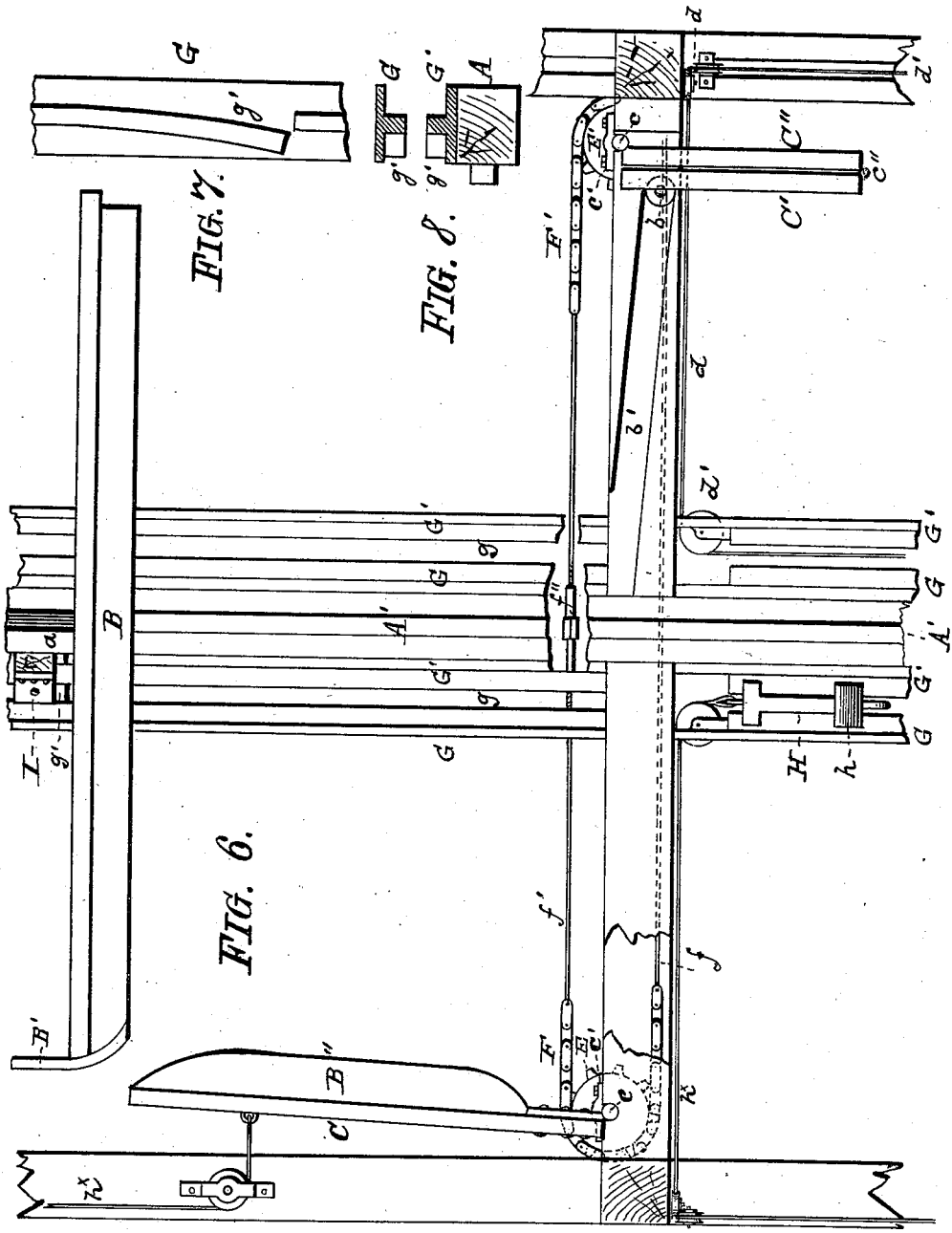
Witnesses:
Al. Stark
Julian Stark
Inventors:
Jos. Papineau,
Frank Hysert,
by Michael J. Stark & Sons,
Attorneys.

No. 613,468. Patented Nov. 1, 1898.
J. PAPINEAU & F. HYSERT.
MECHANISM FOR ACTUATING DOORS OR GATES OF ELEVATORS.
(Application filed July 6, 1897.)
(No Model.) 5 Sheets—Sheet 5.
FIG. 9.
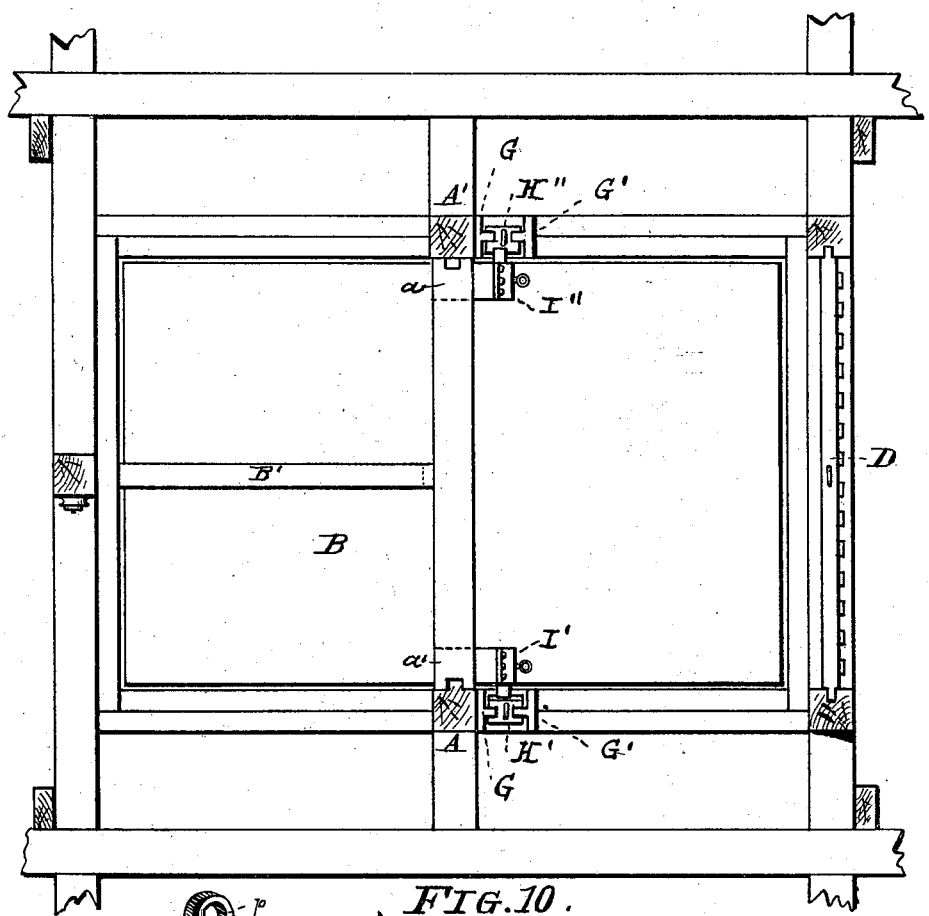
FIG. 11.
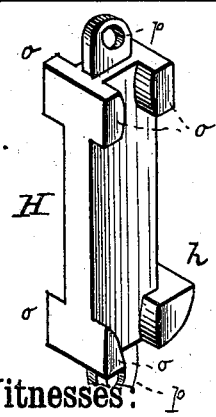
FIG. 10.
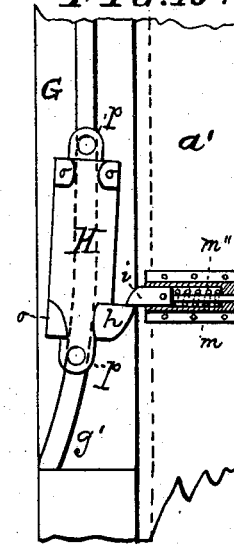
FIG. 12.
FIG. 13.
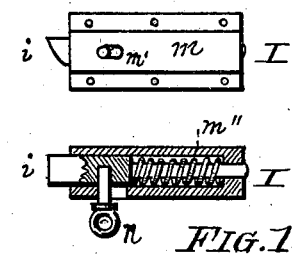
Witnesses:
A. Stark
Centie S Stark
Julian Stark
Inventors:
Jos Papineau,
Frank Hysert,
by Michall Stark & Sons
Attorneys.

UNITED STATES PATENT OFFICE.

JOSEPH PAPINEAU AND FRANK HYSERT, OF BUFFALO, NEW YORK.

MECHANISM FOR ACTUATING DOORS OR GATES OF ELEVATORS.

SPECIFICATION forming part of Letters Patent No. 613,468, dated November 1, 1898.

Application filed July 6, 1897. Serial No. 643,523. (No model.)

*To all whom it may concern:*

Be it known that we, JOSEPH PAPINEAU and FRANK HYSERT, citizens of the United States, residing at Buffalo, in the county of Erie and State of New York, have invented certain new and useful Improvements in Mechanism for Actuating the Doors or Gates of Elevators; and we do hereby declare that the following description of our said invention, taken in connection with the accompanying sheets of drawings, forms a full, clear, and exact specification, which will enable others skilled in the art to which it appertains to make and use the same.

This invention has general reference to mechanism for operating the doors and gates of elevators; and it consists, essentially, in the novel and peculiar combination of parts and details of construction, as hereinafter first fully set forth and described and then pointed out in the claims.

In the drawings already referred to, which serve to illustrate this invention more fully, Figure 1 is a perspective view of an elevator provided with this improved mechanism for operating the doors and gates of elevators. Figs. 2 and 3 are elevations of a portion of an elevator, showing the platform and vertically-sliding gate in their several positions. Fig. 4 is a plan. Fig. 5 is a sectional elevation in line $xx$ of Fig. 4. Fig. 6 is an elevation showing the trap-doors in an open position. Fig. 7 is an elevation of a fragment of one of the guides. Fig. 8 is a sectional plan of the same. Fig. 9 is a plan. Fig. 10 is an elevation of a portion of one of the guides, the platform-uprights, and the dog and catch for operating the same. Fig. 11 is a perspective view of one of the dogs. Fig. 12 is a plan, and Fig. 13 a sectional plan, of the latch.

Like parts are designated by corresponding letters of reference in all the figures.

The object of this invention is the production of an efficient mechanism for actuating the doors and gates of elevators, and in Fig. 1 we have shown in a perspective view a three-story elevator provided with these improvements, some of the parts of the mechanism, being duplicates on each floor, being omitted to prevent crowding of the said drawings.

The main portion of the elevator consists of two oppositely-located vertical guides A A', of usual construction, reaching from the lowest floor to the uppermost story of a building, and of a platform or cage B, also of usual construction and arranged to be properly guided by said vertical guides A A'. On each floor of the building there are arranged either a set of trap-doors C C' C'' or a vertically-sliding gate D, or both, the latter arrangement being especially desirable in buildings where the elevator is not housed in or within a well and where trap-doors are provided to close the openings in the several floors to prevent upward drafts and where gates are arranged to prevent accidents to passengers using the elevator.

The trap-doors consist of a set of three doors, one of which, C, fills one-half of the space through which the platform passes, and it is hinged or pivoted along one edge to a shaft $c$, having its bearings in boxes $c'$, so as to swing from a horizontal to a vertical upright position, while the other half of the opening is closed by two leaves C' C'', hinged together by hinges $c''$ upon the upper surface of the two leaves, said leaf C'' being pivoted or fastened to a shaft $c^\times$, having bearings $c'$ similar to those within which the shaft $c$ oscillates.

The two shafts $c$ $c^\times$ are provided at their outer ends with sprocket-wheels E E', over which link chains F F' are passed, the ends of which are connected together by rods $f$ at the lower portion and by rods $f'$ at their upper portion, said latter rods being fitted with turnbuckles $f''$ of usual construction to enable the rods $f f'$ being tensioned and thereby any slack taken out of the link chains F F'. By thus connecting the two shafts the trap-doors are caused to move simultaneously in the following manner: Assuming the elevator-platform to be on the ascent, there is provided on said platform a curved rod B', which engages a curved guide-piece B'', fastened to the lower surface of the door C, so that as the elevator-platform ascends its curved rod B' raises the door C, while through the sprocket-wheels and chain connections described the doors C' C'' swing downward upon each other to assume the positions shown in Fig. 6, there being secured to the sides of the leaf C' guide-rollers b, running in guideways b' and sustaining the free end of the leaf C', said guideways being inclined, as shown in Fig. 6, which we find necessary for the proper operation of the leaves C' C''. As soon as the elevator-platform has in its ascent passed the door C the latter, not having been swung into a full vertical position, as shown in Fig. 6, will drop slowly by its own gravity and at the same time open up the leaves C' C'', and thereby close the opening in the floor through which the platform passes. In its descent the platform opens the trap-doors in the following manner:

On both sides of the vertical guides A A' are located guide-rails G G', which rails are of T shape, as shown in Figs. 8 and 9, the heads of which, as it were, being oppositely placed, so as to produce slots g between them, and within which is placed a dog H, (shown in perspective in Fig. 11,) which dog has a projection or catch h. On one of the uprights a a' of the platform B is secured in proper position a latch I, Fig. 6, the bolt i of which is arranged to slide within its case, said latch being shown in detail in Figs. 10, 12, and 13, and when projecting from its case to engage the projection h on the dog H, and thereby to pull the same downwardly, said dog being connected with the door C by a rope $h^\times$, Figs. 4 and 6, passing over suitable guiding-wheels h'. In the heads of the rails G G' there is a curved portion g', arranged and located in such a position that when the platform in its descent has opened the trap-door C by the bolt i acting upon the projection h of the dog the latter has arrived at the said curved portion, so that as the platform continues to descend the dog passes upon the said curved portion g' and gradually recedes from the bolt i, as shown in Fig. 10, until said dog H has moved back sufficiently to clear the bolt i, and thereby released the dog. In this position the trap-door C is held in an open position by its curved guide-piece B'' bearing upon the curved rod B' until the platform has descended sufficiently to allow the trap-door C to close by gravity, the same as it does when the platform is on the ascent. It will now be readily seen that the mechanism for actuating the trap-doors is at once simple, but perfectly positive in its action, and there being but few simple parts there is no liability of the mechanism becoming disarranged and inoperative.

The gate or gates D, already referred to, are operated by means of dogs H' H'', Fig. 9, moving between T-shaped rails identical with those for the trap-doors, except that in this instance one dog lifts the gate when the platform ascends, while the opposite dog lifts the gate when the platform descends, said dogs being connected with the gate D by a set of ropes d, passing over suitably-disposed guide-wheels d', as illustrated in Figs. 2 and 3, Fig. 2 showing the platform even with one of the floors and the gate D open, while Fig. 3 shows the platform in the descent and at the point where the latch I'' engages with its bolt i the projection h on the dog H'' to open the gate D.

In operating elevators it is desirable to run the platform past one or more floors without opening the gates. To accomplish this result, we construct the latch mechanism in the following manner: The bolt i is connected with a bell-crank J, which by means of a rope j connects with one arm j' of a T-lever J', the second arm j''' of which connects by a rope k with the bolt of the latch I', while the third arm j'' is fitted with a pull-cord $j^\times$. By pulling this cord the bolts of the latches I' I'' are retracted to clear the projections h of the dogs H' H'', and thus the gates D left closed. A ring k' on the end of the pull-cord $j^\times$ may be arranged to engage a hook k'', and thus keep the bolts i in a retracted position.

The latches are shown in detail in Figs. 12 and 13 and consist of a case m, having a slotted aperture m', through which the shank of an eyebolt n passes into the bolt i and by means of which the latter is retracted, a spiral spring m'' in the case m around the shank of the bolt i advancing the latter, the distance of movement of the bolt i being limited by the slotted aperture m'.

The dogs H are metallic castings of sufficient weight to balance the gate D. They have projecting lugs o, by which they are guided on the heads of the rails, and they have, furthermore, eyes p on both ends, to which the ropes that actuate the doors and gates are attached. By supplying these dogs with eyes p on both ends they are made reversible— that is to say, one pattern of these dogs serves for both the one which is engaged when the platform ascends and the one which is being engaged when the platform descends, thus materially simplifying the construction and reducing the number of patterns required to produce the same.

It may be well to here state that the arrangement of timbers shown in the drawings is more or less arbitrary and will have to be arranged in accordance with the structural disposition of a building within which the elevator is to be operated. We do not, therefore, deem it necessary to fully describe this timber structure, it being a matter well understood by skilled mechanics who may be called upon to place the gates and doors into a building.

Having thus fully described our invention, we claim—

1. In mechanism for actuating doors of elevators, a door, a shaft secured to one edge thereof, suitable bearings for said shaft, a second door composed of two leaves hinged together at their upper surface, a shaft attached to the outer edge of one of the leaves, suitable bearings for this shaft, sprocket-wheels on the ends of said shafts, link chains and rods connecting the said sprocket-wheels, guide-rolls for the free end of the inner leaf, inclined guideways for said guide-rolls, and suitable mechanism for actuating one of the doors, as described.

2. In mechanism for actuating doors and gates of elevators, the combination, with the dogs, of the latches, the T-lever on the platform structure, a bell-crank engaging one of the bolts of said latches, a cord connecting one arm of the T-lever with the arm of the bell-crank, a second cord connecting the second arm of the T-lever with the second latch, and a pull-cord on the third arm of the T-lever, as described.

In testimony that we claim the foregoing as our joint invention we have hereunto set our hands in the presence of two subscribing witnesses.

JOSEPH PAPINEAU.
FRANK HYSERT.

Attest:
AL. STARK,
W. O. RICE.